United States Patent
Yen et al.

(10) Patent No.: US 10,860,247 B2
(45) Date of Patent: Dec. 8, 2020

(54) DATA WRITING METHOD AND STORAGE CONTROLLER

(71) Applicant: Shenzhen EpoStar Electronics Limited CO., Shenzhen (CN)

(72) Inventors: Heng-Lin Yen, Hsinchu County (TW); Hung-Chih Hsieh, Hsinchu County (TW); Tzu-Wei Fang, Taipei (TW); Yu-Hua Hsiao, Hsinchu County (TW)

(73) Assignee: Shenzhen EpoStar Electronics Limited CO., Shenzhen (CN)

( * ) Notice: Subject to any disclaimer, the term of this patent is extended or adjusted under 35 U.S.C. 154(b) by 0 days.

(21) Appl. No.: 16/136,280

(22) Filed: Sep. 20, 2018

(65) Prior Publication Data
US 2020/0026464 A1 Jan. 23, 2020

(30) Foreign Application Priority Data

Jul. 20, 2018 (TW) .............................. 107125097 A (51) Int. Cl.
*G06F 12/00* (2006.01)
*G06F 3/06* (2006.01)
*G06F 12/1009* (2016.01)

(52) U.S. Cl.
CPC .......... *G06F 3/0659* (2013.01); *G06F 3/0619* (2013.01); *G06F 3/0679* (2013.01); *G06F 12/1009* (2013.01); *G06F 2212/1032* (2013.01); *G06F 2212/7201* (2013.01)

(58) Field of Classification Search
CPC ... G06F 11/1458; G06F 12/0246; H04L 49/90
See application file for complete search history.

(56) References Cited

U.S. PATENT DOCUMENTS

2002/0144078 A1* 10/2002 Topham .............. G06F 12/1054
711/203
2006/0236050 A1* 10/2006 Sugimoto ........... G06F 11/1458
711/162

(Continued)

FOREIGN PATENT DOCUMENTS

TW 201820114 6/2018
TW 201824291 7/2018

OTHER PUBLICATIONS

"Office Action of Taiwan Counterpart Application," dated Feb. 23, 2019, p. 1-p. 3.

*Primary Examiner* — Ryan Bertram
*Assistant Examiner* — Trang K Ta
(74) *Attorney, Agent, or Firm* — JCIPRNET (57) ABSTRACT

A data writing method is provided. The method includes receiving a first write command and first data corresponding to the first write command from a host system, wherein the first write command instructs to store the first data into a first logical address; copying the first data into a register, responding to the host system that the first write command is completed, and starting to execute a first program operation to program the first data into a first physical page; and in response to determining that the first program operation is failed, reading the first data from the register according to a logical to physical addresses mapping table and mandatorily programming the first data into a second physical page.

8 Claims, 4 Drawing Sheets

(56) References Cited

U.S. PATENT DOCUMENTS

| | | | |
|---|---|---|---|
| 2008/0022021 A1* | 1/2008 | Hsieh | H04L 49/90 710/52 |
| 2009/0198871 A1* | 8/2009 | Tzeng | G06F 12/0246 711/103 |
| 2013/0036258 A1* | 2/2013 | Teo | G06F 12/0246 711/103 |
| 2018/0095879 A1 | 4/2018 | Han et al. | |

* cited by examiner

DATA WRITING METHOD AND STORAGE CONTROLLER

CROSS-REFERENCE TO RELATED APPLICATION

This application claims the priority benefit of Taiwan application serial no. 107125097, filed on Jul. 20, 2018. The entirety of the above-mentioned patent application is hereby incorporated by reference herein and made a part of this specification.

BACKGROUND OF THE DISCLOSURE

Field of the Disclosure

The disclosure is related to a data writing method, and particularly to a data writing method and a storage controller adapted for a storage device equipped with a rewritable non-volatile memory module.

Description of Related Art

Generally speaking, in order to avoid failure of writing operation, the storage controller of storage device uses a larger buffer memory to store the data for the writing operation to be performed, such that the write data is read from the buffer memory to re-perform the writing operation of the write data when the writing operation is failed.

However, as the capacity of flash memory is increased, the size of the write data that is stored in the buffer memory for preventing failure of writing operation is increased as well. As a result, the requirement for space of buffer memory is increased, which causes the overall cost of the storage device to increase.

In light of the above, it is an issue for practitioners of the field to find out how to recover the failed writing operation and maintain accuracy and reliability of writing operation without using the buffer memory to back up the write data.

SUMMARY OF THE DISCLOSURE

The disclosure provides a data writing method, capable of directly reading the write data from a register in response to failure of a program operation corresponding to the write data under the condition where the write data is not stored in a buffer memory, thereby re-performing the program operation corresponding to the write data that is read and recovering the write data that is supposed to be programmed into the rewriteable non-volatile memory module.

An embodiment of the disclosure provides a data writing method adapted for a storage device equipped with a rewritable non-volatile memory module, wherein the rewritable non-volatile memory module has a plurality of physical pages. The method includes the following steps: receiving a first write command and a first data corresponding to the first write command from a host system, storing the first write command into a command queue in a buffer memory, and storing the first data into the buffer memory, wherein the first write command instructs to store the first data into a first logical address; starting to execute the first write command, copying the first data into a register, recording a first physical address into a logical-to-physical address mapping table to map the first physical address into the first logical address, responding to the host system that the first write command is completed, and starting to perform a first program operation to program the first data from the register into the first physical page; and performing a first re-program operation corresponding to the first data in response to determining that the first program operation is failed. The first re-program operation includes the following steps: determining whether to read the first data from the register according to the logical-to-physical address mapping table; reading the first data from the register in response to determining to read the first data from the register; and mandatorily programming the first data into a second physical page, and recording a second physical address of the second physical page into the logical-to-physical address mapping table to map the second physical address into the first logical address after the first data is programmed into the second physical page, thereby completing the first re-program operation.

An embodiment of the disclosure provides a storage controller configured for controlling a storage device equipped with a rewritable non-volatile memory module. The storage controller includes a connection interface circuit, a memory interface control circuit, a write resuming operation circuit unit and a processor. The connection interface circuit is coupled to a host system. The memory interface control circuit is coupled to the rewritable non-volatile memory module, wherein the rewritable non-volatile memory module has a plurality of physical pages. The processor is coupled to the connection interface circuit, the memory interface control circuit and the write resuming operation circuit unit, and receives a first write command and a first data corresponding to the first write command from the host system, stores the first write command into a command queue in a buffer memory, and stores the first data into the buffer memory, wherein the first write command instructs to store the first data into a first logical address. The processor further starts to execute the first write command, copies the first data into a register, and records a first physical address into a logical-to-physical address mapping table to map the first physical address into the first logical address, wherein the processor further responds to the host system that the first write command is completed, and instructs the memory interface control circuit to start performing a first program operation to program the first data from the register into the first physical page. Additionally, the processor further instructs the write resuming operation circuit unit to perform a first re-program operation corresponding to the first data in response to determining that the first program operation is failed. The first re-program operation includes the following steps: the write resuming operation circuit unit determines whether to read the first data from the register according to the logical-to-physical address mapping table; the write resuming operation circuit unit reads the first data from the register in response to determining to read the first data from the register; and the write resuming operation circuit unit mandatorily programs the first data into a second physical page, and records a second physical address of the second physical page into the logical-to-physical address mapping table to map the second physical address into the first logical address after the first data is programmed into the second physical page, thereby completing the first re-program operation.

Based on the above, the data writing method and the storage controller provided in the embodiment of the disclosure are capable of directly reading the data from the register in response to determining that a program operation corresponding to a data is failed, thereby re-programming the data and resuming the previously failed program operation. In this manner, the completeness and reliability of the data writing operation of the storage device can be improved.

In order to make the aforementioned features and advantages of the disclosure more comprehensible, embodiments accompanying figures are described in detail below.

DESCRIPTION OF EMBODIMENTS

In the embodiment, a storage device includes a rewritable non-volatile memory module and a storage device controller (a.k.a. a storage controller or a storage control circuit). Also, the storage device is usually used together with a host system so the host system can write data into or read data from the storage device.

Figure 1:
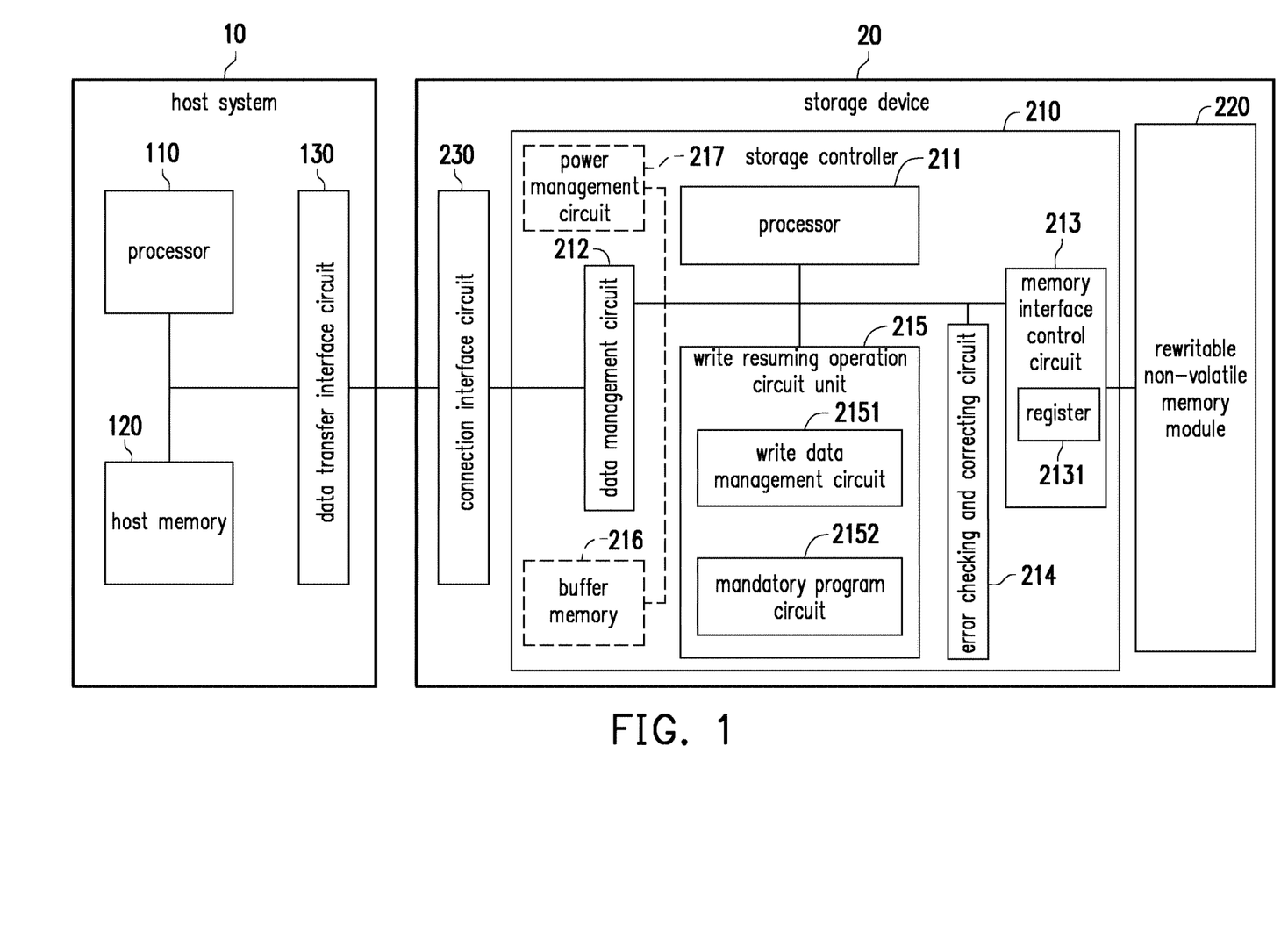
FIG. 1 is a block diagram illustrating a host system and a storage device according to an embodiment of the disclosure.

FIG. 1 is a block diagram illustrating a host system and a storage device according to an embodiment of the disclosure.

With reference to FIG. 1, a host system 10 includes a processor 110, a host memory 120 and a data transfer interface circuit 130. In this embodiment, the data transfer interface circuit 130 is coupled to (or, electrically connected to) the processor 110 and the host memory 120. In another embodiment, the processor 110, the host memory 120 and the data transfer interface circuit 130 are coupled to one another by utilizing a system bus.

A storage device 20 includes a storage controller 210, a rewritable non-volatile memory module 220 and a connection interface circuit 230. Among them, the storage controller 210 includes a processor 211, a data management circuit 212 and a memory interface control circuit 213.

In this embodiment, the host system 10 is coupled to the storage device 20 through the data transfer interface circuit 130 and the connection interface circuit 230 of the storage device 20 to perform a data accessing operation. For example, the host system 10 can store data to the storage device 20 or read data from the storage device 20 through the data transfer interface circuit 130.

In the embodiment, the processor 110, the host memory 120 and the data transfer interface circuit 130 may be disposed on a main board of the host system 10. The number of the data transfer interface circuit 130 may be one or more. Through the data transfer interface circuit 130, the main board may be coupled to the storage device 20 in a wired manner or a wireless manner. The storage device 20 may be, for example, a flash drive, a memory card, a solid state drive (SSD) or a wireless memory storage device. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board may also be coupled to various I/O devices including a GPS (Global Positioning System) module, a network interface card, a wireless transmission device, a keyboard, a monitor and a speaker through the system bus.

In this embodiment, the data transfer interface circuit 130 and the connection interface circuit 230 are an interface circuit compatible with a Peripheral Component Interconnect Express (PCI Express) interface standard. Further, a data transfer is performed between the data transfer interface circuit 130 and the connection interface circuit 230 by using a communication protocol of a Non-Volatile Memory express (NVMe) interface standard.

Nevertheless, it should be understood that the disclosure is not limited to the above. The data transfer interface circuit 130 and the connection interface circuit 230 may also be compatible to a PATA (Parallel Advanced Technology Attachment) standard, an IEEE (Institute of Electrical and Electronic Engineers) 1394 standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC interface standard, a UFS (Universal Flash Storage) interface standard, an eMCP interface standard, a CF interface standard, an IDE (Integrated Device Electronics) interface standard or other suitable standards. Further, in another embodiment, the connection interface circuit 230 and the storage controller 210 may be packaged into one chip, or the connection interface circuit 230 is distributed outside a chip containing the storage controller 210.

In this embodiment, the host memory 120 is configured to temporarily store commands or data executed by the processor 110. For instance, in this exemplary embodiment, the host memory 120 may be a DRAM (Dynamic Random Access Memory), or a SRAM (Static Random Access Memory) and the like. Nevertheless, it should be understood that the disclosure is not limited in this regard, and the host memory 120 may also be other appropriate memories.

The storage unit 210 is configured to execute a plurality of logic gates or control commands, which are implemented in a hardware form or in a firmware form, and to perform operations of writing, reading or erasing data in the rewritable non-volatile memory storage module 220 according to the commands of the host system 10.

More specifically, the processor 211 in the storage controller 210 is a hardware with computing capabilities, which is configured to control overall operation of the storage controller 210. Specifically, the processor 211 has a plurality of control commands and the control commands are executed to perform various operations such as writing, reading and erasing data during operation of the storage device 20.

It should be noted that, in the embodiment, the processor 110 and the processor 211 are, for example, a central processing unit (CPU), a micro-processor, other programmable microprocessors, a digital signal processor (DSP), a programmable controller, an application specific integrated circuits (ASIC), a programmable logic device (PLD) or other similar circuit elements. The disclosure is not limited in this regard.

In an embodiment, the storage controller 210 further includes a ROM (not illustrated) and a RAM (not illustrated). More particularly, the ROM has a boot code, which is executed by the processor 221 to load the control commands stored in the rewritable non-volatile memory module 220 into the RAM of the storage controller 210 when the storage controller 210 is enabled. Then, the control commands are executed by the processor 211 to perform operations, such as writing, reading or erasing data. In another embodiment, the control commands of the processor 211 may also be stored as program codes in a specific area (for example, physical storage units in the rewritable non-volatile memory module 220 dedicated for storing system data) of the rewritable non-volatile memory module 220.

In this embodiment, as described above, the storage controller 210 further includes the data management circuit 212 and the memory interface control circuit 213. It should be noted that, operations performed by each part of the storage controller 210 may also be considered as operations performed by the storage controller 210.

The data management circuit 212 is coupled to the processor 211, the memory interface control circuit 213 and the connection interface circuit 230. The data management circuit 212 is configured to transmit data under instruction of the processor 211. For example, the data may be read from the host system 10 (e.g., the host memory 120) through the connection interface circuit 230, and the read data may be written into the rewritable non-volatile memory module 220 through the memory interface control circuit 213 (e.g., a writing operation performed according to the write command from the host system 10). As another example, the data may be read from one or more physical units of the rewritable non-volatile memory module 220 through the memory interface control circuit 213 (the data may be read from one or more memory cells in one or more physical units), and the read data may be written into the host system 10 (e.g., the host memory 120) through the connection interface circuit 230 (e.g., a reading operation performed according to a read command from the host system 10). In another embodiment, the data management circuit 212 may also be integrated into the processor 211.

The memory interface control circuit 213 is configured to perform the writing (or, programming) operation, the reading operation and the erasing operation for the rewritable non-volatile memory module 220 together with the data management circuit 212 under instruction of the processor 211.

For instance, the processor 211 may execute a write command sequence to instruct the memory interface control circuit 213 to write the data into the rewritable non-volatile memory module 220; the processor 211 can execute a read command sequence to instruct the memory interface control circuit 213 to read the data from one or more physical units (a.k.a. target physical unit) corresponding to the read command in the rewritable non-volatile memory module 220; the processor 211 can execute an erase command sequence to instruct the memory interface control circuit 213 to perform the erasing operation for the rewritable non-volatile memory module 220. Each of the write command sequence, the read command sequence and the erase command sequence may include one or more program codes or command codes, which are configured to perform the corresponding writing, reading and erasing operations on the rewritable non-volatile memory module 220. In an embodiment, the processor 211 may further send other types of command sequences to the memory interface control circuit 213 so as to perform corresponding operations on the rewritable non-volatile memory module 220.

In addition, data to be written to the rewritable non-volatile memory module 220 is converted into a format acceptable by the rewritable non-volatile memory module 220 through the memory interface control circuit 213. Specifically, if the processor 211 is to access the rewritable non-volatile memory module 220, the processor 211 transmits a corresponding command sequence to the memory interface control circuit 213 to instruct the memory interface control circuit 213 to perform a corresponding operation. For example, the command sequences may include a write command sequence instructing to write data, a read command sequence instructing to read data, an erase command sequence instructing to erase data and corresponding command sequences instructing to perform various memory operations (e.g., changing a plurality of predetermined read voltage values of a predetermined read voltage set to perform a read operation, or performing a garbage collecting program and so on). The command sequences may include one or more signals, or data from the bus. The signals or the data may include command codes and program codes. For example, information such as identification codes and memory addresses are included in the read command sequence.

It should be noted that, in the embodiment, the memory interface control circuit 213 includes a register 2131 configured to temporarily store the data to be written into the rewritable non-volatile memory module 220. Specifically, after the data to be written to the rewritable non-volatile memory module 220 is converted into a format acceptable by the rewritable non-volatile memory module 220 through the memory interface control circuit 213, the converted data is stored into the register 2131. Next, the memory interface control circuit 213 uses a corresponding programming voltage to program the converted data stored in the register 2131 into the rewritable non-volatile memory module 220.

The rewritable non-volatile memory module 220 is coupled to the storage controller 210 (the memory control circuit unit 213) and configured to store data written from the host system 10. The rewritable non-volatile memory module 220 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Quadruple Level Cell) NAND flash memory module (i.e., a flash memory module capable of storing four bits in one memory cell), a 3D NAND flash memory module, a vertical NAND flash memory module, other flash memory modules etc. or any memory module having the same characteristics. The memory cells in the rewritable non-volatile memory module 220 are disposed in an array.

In this embodiment, the rewritable non-volatile memory module 220 has a plurality of word lines, wherein each word line among the word lines includes a plurality of memory cells. The memory cells on the same word line constitute one or more physical programming units (physical pages). In addition, a plurality of physical programming units may constitute one physical unit (a physical block or a physical erasing unit).

In this embodiment, one physical page is used as a minimum unit for writing (programming) data. The physical unit is a minimum unit for erasing (i.e., each physical unit includes a minimum number of memory cells to be erased together). Further, the address of each of the physical pages may also be referred to as physical address.

It should be noted that, in the embodiment, the system data configured for recording information of one physical unit may be recorded by using one or more memory cells in the physical unit, or recorded by using one or more memory cells of a specific physical unit in one system region that is configured to record all of the system data.

Further, it should be understood that, when the processor 211 groups the memory cells (or the physical units) in the rewritable non-volatile memory module 220 for the corresponding management operations, the memory cells (or the physical units) are logically grouped and their actual locations are not changed.

The storage controller 210 assigns a plurality of logical units for the rewritable non-volatile memory module 220. The host system 10 accesses user data stored in a plurality of physical units through the assigned logical units. Here, each of the logical units may be composed of one or more logical addresses. For example, the logical unit may be a logical block, a logical page, or a logical sector. Each logical unit may be mapped to one or more physical units, wherein the physical unit may be one or more physical addresses, one or more physical sectors, one or more physical programming units, or one or more physical erasing units. In the embodiment, the logical unit is a logical block, and the logical sub-unit is a logical page. Each logical unit includes a plurality of logical sub-units. In the embodiment, the address of the logical sub-unit may also be referred to as logical address.

Additionally, the storage controller 210 would create a logical-to-physical address mapping table and a physical-to-logical address mapping table for recording a mapping relation between the logical addresses assigned to the rewritable non-volatile memory module 220 and the physical addresses. In other words, the storage controller 210 can look up for the physical unit mapped by one logical address by using the logical-to-physical address mapping table, and the storage controller 210 can look up for the logical address mapped by one physical address by using the physical-to-logical address mapping table. Nonetheless, the technical concept for the mapping relation between the logical addresses and the physical addresses is a well-known technical means in the field, which is not repeated hereinafter. In typical operation of storage controller, the logical-to-physical address mapping table and the physical-to-logical address mapping table may be maintained in the buffer memory 216.

In this embodiment, the error checking and correcting circuit 214 is coupled to the processor 211 and configured to execute an error checking and correcting procedure to ensure correctness of data. Specifically, when the processor 211 receives the write command from the host system 10, the error checking and correcting circuit 214 generates an ECC (error correcting code) and/or an EDC (error detecting code) for data corresponding to the write command, and the processor 211 writes data corresponding to the write command and the corresponding ECC and/or the EDC into the rewritable non-volatile memory module 220. Then, when the processor 211 reads the data from the rewritable non-volatile memory module 220, the ECC and/or the EDC corresponding to the data are also read, and the error checking and correcting circuit 214 performs the error checking and correcting procedure on the read data based on the ECC and/or the EDC. In addition, after the error checking and correcting procedure is completed, if the read data is successfully decoded, the error checking and correcting circuit 214 can return an error bit value to the processor 211.

In an embodiment, the storage controller 210 further includes a buffer memory 216 and a power management circuit 217. The buffer memory 216 is coupled to the processor 211 and configured to temporarily store data and commands from the host system 10, data from the rewritable non-volatile memory module 220 or other system data for managing the storage device 20 so the processor 211 can rapidly access the data, the command or the system data from the buffer memory 216. The power management circuit 217 is coupled to the processor 211 and configured to control power of the storage device 20.

In the embodiment, the write resuming operation circuit unit 215 includes a write data management circuit 2151 and a mandatory program circuit 2152. The write resuming operation circuit unit 215 receives an instruction of the processor 211 to execute a write command or perform a re-program operation. It should be indicated that, in an embodiment, the write resuming operation circuit unit 215 may be integrated into the processor 211 such that the processor 211 can implement the data writing method provided in the embodiment.

The data writing method provided in the embodiment of the disclosure are described in details below with reference to drawings, and functions of the storage controller 210 and the write resuming operation circuit unit 215 corresponding to the data writing method are also described below.

Figure 2:
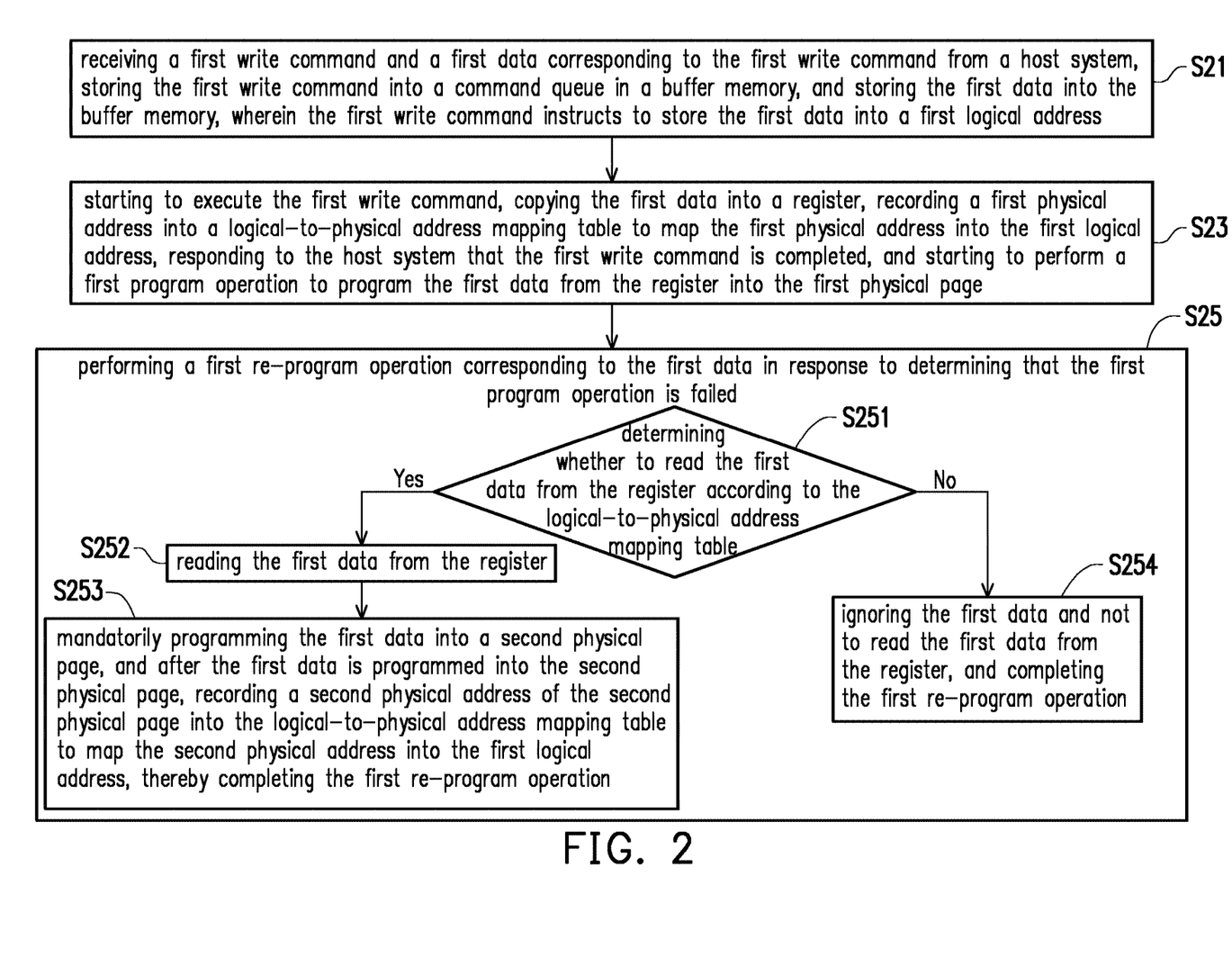
FIG. 2 is a flowchart diagram of a data writing method according to an embodiment of the disclosure.

FIG. 2 is a flowchart diagram of a data writing method according to an embodiment of the disclosure. Referring to FIG. 1 and FIG. 2, in step S21, the processor 211 receives a first write command and a first data corresponding to the first write command from the host system 10, stores the first write command into a command queue in the buffer memory 216, and stores the first data into the buffer memory 216, wherein the first write command instructs to store the first data into a first logical address.

Specifically, the processor 211 may divide a region in the buffer memory 216 as a command queue. The command queue records (stores) the write command and the read command received from the host system 10. Additionally, the command queue may record other types of command. For instance, every time when the processor 211 receives a command from the host system, the processor 211 stores the command into the command queue. Next, the processor 211 executes the command recorded in the command queue according to a first in first out approach. If the received command is a write command, the processor 211 further stores the data corresponding to the write command received from the host system 10 into a buffer region or a write data buffer region in the buffer memory 216.

Thereafter, in step S23, the processor 211 starts to execute the first write command, copies the first data into a register 2131, records a first physical address into a logical-to-physical address mapping table to map the first physical address into the first logical address, responds to the host system 10 that the first write command is completed, and starts to perform the first program operation to program the first data from the register 2131 into the first physical page.

Specifically, according to the sequence of a plurality of commands arranged in the command queue, the processor 211 is to execute a first write command. Next, the processor 211 selects one physical block (i.e., first physical block) among all of the usable physical blocks from the rewritable non-volatile memory module 220 to serve as a physical block that stores the first data, and starts to execute the first write command to write the first data into a first physical page of the first physical block. The address of the first physical page is also referred to as the first physical address.

Next, the processor 211 reads the first data from the buffer memory, and copies the first data into the register 2131. After the operation of copying the first data into the register 2131 is completed, the processor 211 records the first physical address into the logical-to-physical address mapping table to map the first physical address into the first logical address. The logical-to-physical address mapping table is stored in the buffer memory 216. The disclosure provides no limitation to the specific format of the logical-to-physical address mapping table. However, through the logical-to-physical address mapping table, the processor 211 is able to know that the first data stored in the first physical address of the rewritable nonvolatile memory module 220 is the first data stored in the first logical address as instructed by the host system 10.

After recording the logical-to-physical address mapping table to record the mapping relationship between the first physical address and the first logical address, the processor 211 responds to the host system 10 that the first write command is completed.

It should be noted that, in an embodiment, after recording the logical-to-physical address mapping table to record the mapping relationship between the first physical address and the first logical address, due to space requirement/management of the buffer memory, the first data and the first write command in the command queue stored in the buffer memory 216 are likely to be deleted. On this occasion, the first data is only stored in the register 2131 and has not been programmed into the first physical address (first physical page) of the rewritable non-volatile memory module 220 yet. In other words, after the first data is stored into the register 2131, the first data is not necessarily maintained in the buffer memory 216 (i.e., it is not guaranteed that the first data is stored in the buffer memory 216). Based on the above, if the first data is to be re-programmed, the processor 211 or the write resuming operation circuit unit 215 does not look for the first data in the buffer memory 216.

Afterwards, the processor 211 may instruct the memory interface control circuit 213 to start to perform the program operation (i.e., first program operation) corresponding to the first data, thereby applying the programming voltage to program the first data stored in the register 2131 into the first physical page.

In the embodiment, the memory interface control circuit 213 may perform a write examining operation after performing the first program operation, thereby applying an examining voltage to read the first physical page to determine whether the first program operation is succeeded or failed (obtaining first examining result). The disclosure provides no limitation to the details of the write examining operation. The memory interface control circuit 213 may return the examining result to the processor 211 such that the processor 211 can determine whether the first program operation is succeeded or failed.

In an embodiment, if abnormality (e.g., time-out event) is occurred during the first program operation, the processor 211 may also determine that the first program operation is failed.

In step S25, the processor 211 instructs the write resuming operation circuit unit 215 to perform a first re-program operation corresponding to the first data in response to determining that the first program operation is failed.

Specifically, the first re-program operation may include steps S251, S252, S253, S254.

In step S251, the write resuming operation circuit unit 215 (or write data management circuit 2151) determines whether to read the first data from the register 2131 according to the logical-to-physical address mapping table. In other words, under the condition where the first data is still stored in the register 2131, the write resuming operation circuit unit 215 (or write data management circuit 2151) may further determine whether it is necessary to read the first data from the register 2131 according to the logical-to-physical address mapping table. Details of S251 are described below with reference to FIG. 3A and FIG. 3B.

Figure 3A:
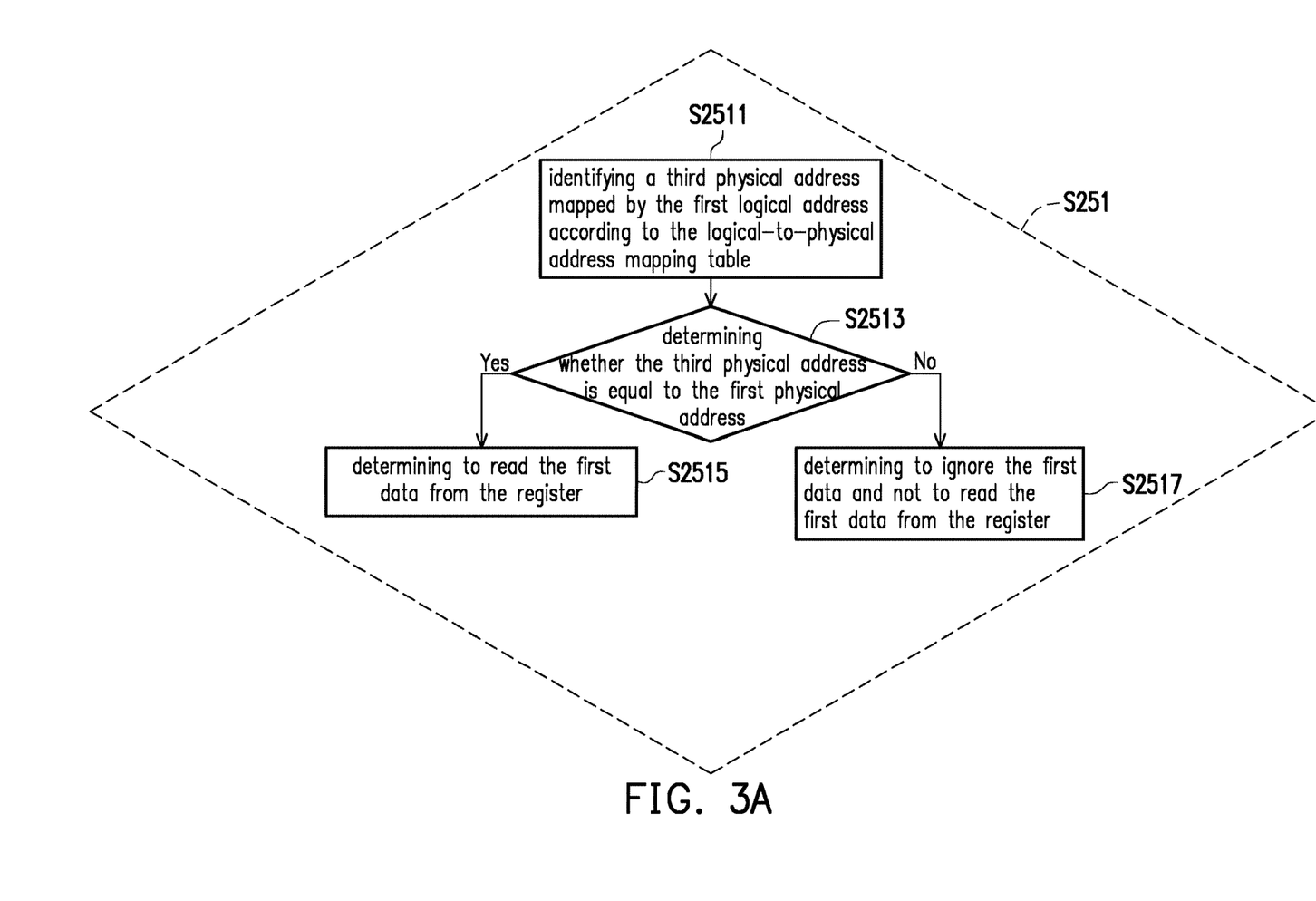
FIG. 3A is a flowchart diagram of step S251 in FIG. 2 according to an embodiment of the disclosure.

FIG. 3A is a flowchart diagram of step S251 in FIG. 2 according to an embodiment of the disclosure.

In step S2511, the write resuming operation circuit unit 215 (or write data management circuit 2151) identifies a third physical address mapped by the first logical address according to the logical-to-physical address mapping table.

Specifically, the write resuming operation circuit unit 215 (or write data management circuit 2151) reads the latest logical-to-physical address mapping table, and looks up for the physical address (i.e., third physical address) corresponding to the first logical address from the logical-to-physical address mapping table.

As indicated above, during the period that the first write command is executed, since the first physical address corresponding to the first logical address is recorded in the logical-to-physical address mapping table before the first data has not been programmed yet, if the physical address corresponding to the first logical address in the logical-to-physical address mapping table is not the first physical address that is recorded previously, the write resuming operation circuit unit 215 (or write data management circuit 2151) may determine that the data stored in the third physical address that corresponds to the first logical address and different from the first physical address in the logical-to-physical address mapping table is a new data (the new write command also instructs to write the new data into the first logical address) that corresponds to a new write command. On this occasion, the write resuming operation circuit unit 215 (or write data management circuit 2151) determines not to read the older first data from the register 2131. On the contrary, the write resuming operation circuit unit 215 (or write data management circuit 2151) interprets that there is no new write command to write new data into the first logical address, and determines that it is necessary to read the older first data from the register 2131.

Specifically, in step S2513, the write resuming operation circuit unit 215 (or write data management circuit 2151) determines whether the third physical address is equal to the first physical address. In response to determining that the third physical address is equal to the first physical address (S2513→yes), step S2515 is performed subsequently, and the write resuming operation circuit unit 215 (or write data management circuit 2151) determines to read the first data from the register 2131 (i.e., S251→yes).

On the contrary, in response to determining that the third physical address is not equal to the first physical address (S2513→no), step S2517 is performed subsequently, the write resuming operation circuit unit 215 (or write data management circuit 2151) determines to ignore the first data and not to read the first data from the register 2131 (i.e., S251→no).

However, in another embodiment, in response to determining that the third physical address is equal to the first physical address (S2513→yes), the write resuming operation circuit unit 215 (or write data management circuit 2151) further determines whether to read the first data from the register 2131 according to the command queue.

Figure 3B:
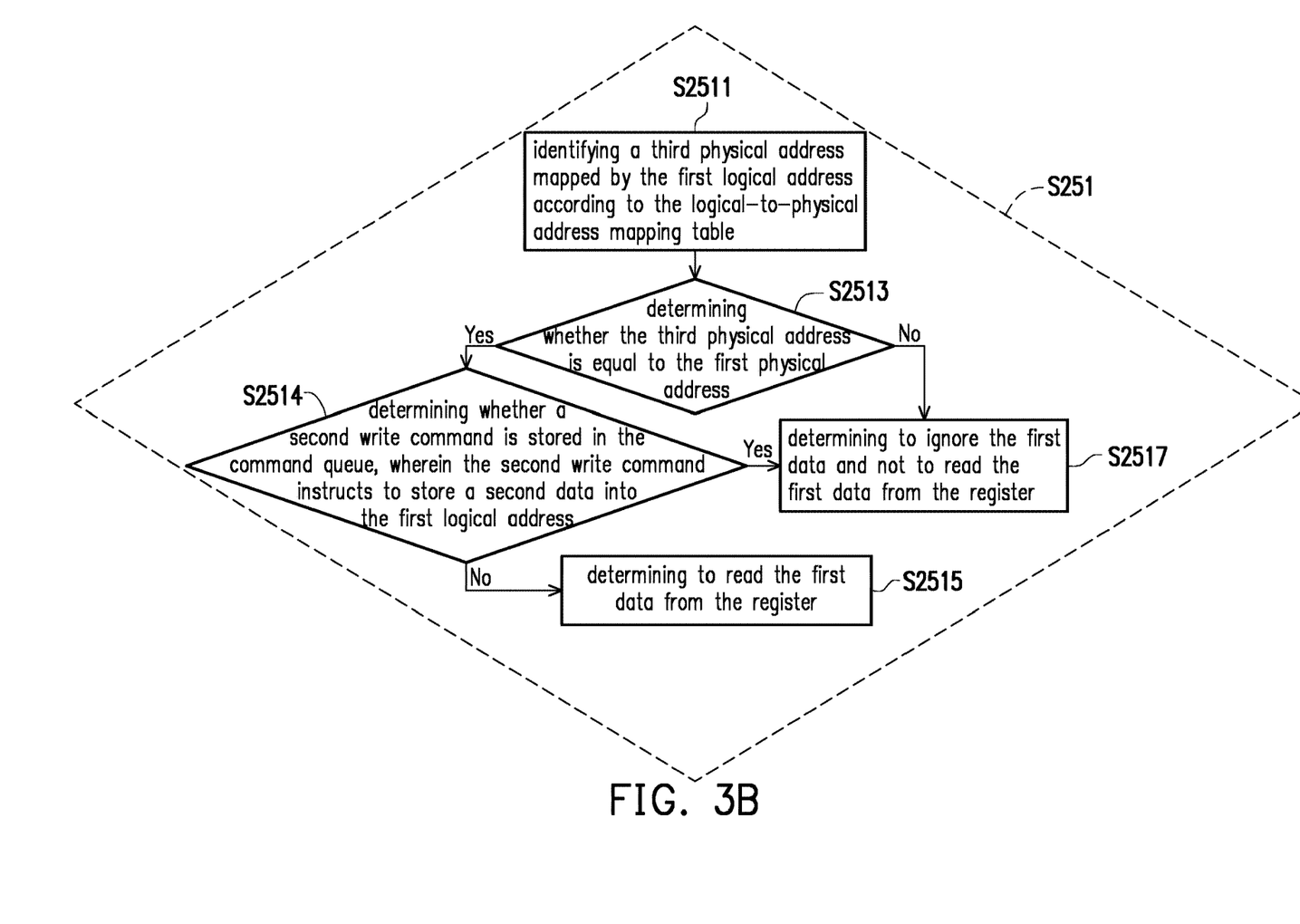
FIG. 3B is a flowchart diagram of step S251 in FIG. 2 according to another embodiment of the disclosure.

FIG. 3B is a flowchart diagram of step S251 in FIG. 2 according to another embodiment of the disclosure. In FIG. 3B, steps S2511, S2513, S2515, S2517 are the same as the steps shown in FIG. 3A, and related descriptions are omitted hereinafter. Only the different step relative to FIG. 3A, i.e., step S2514 shown in FIG. 3B, is described below.

In another embodiment, in response to determining that the third physical address is equal to the first physical address (S2513→yes), step S2514 is performed subsequently, and the write resuming operation circuit unit 215 (or write data management circuit 2151) determines whether the second write command is stored into the command queue, wherein the second write command instructs to store the second data into the first logical address.

In other words, after determining that the third physical address is equal to the first physical address, the write resuming operation circuit unit 215 (or write data management circuit 2151) further checks whether there is other write command (i.e., second write command) recorded in the command queue that instructs to write the data (i.e., second data) into the first logical address (the same as the logical address instructed by the first write command). If so (S2514→yes), the write resuming operation circuit unit 215 (or write data management circuit 2151) interprets that there is no need to re-program the first data (because, even if the first data is re-programmed, the corresponding first logical address would be replaced by the new second data), and thus step S2517 is performed subsequently, and the write resuming operation circuit unit 215 (or write data management circuit 2151) determines to ignore the first data and not to read the first data from the register 2131 (i.e., S2514→no). In this manner, it is possible to avoid performing the unnecessary first re-program operation.

On the contrary (S2514→no), step S2515 is performed subsequently, and the write resuming operation circuit unit 215 (or write data management circuit 2151) determines to read the first data from the register 2131 (i.e., S251→yes).

Returning to FIG. 2, after step S251 is performed, step S252 is performed subsequently in response to determining to read the first data from the register 2131 (i.e., S251→yes), and the write resuming operation circuit unit 215 (or write data management circuit 2151) reads the first data from the register 2131. Specifically, the write resuming operation circuit unit 215 (or write data management circuit 2151) may use a vendor command corresponding to the rewriteable non-volatile memory module 220 to read the first data from the register 2131. The first data may be temporarily stored in the buffer memory 216.

Next, in step S253, the write resuming operation circuit unit 215 (or mandatory program circuit 2151) mandatorily programs the first data into a second physical page, and after the first data is programmed into the second physical page, a second physical address of the second physical page is recorded into the logical-to-physical address mapping table to map the second physical address into the first logical address, thereby completing the first re-program operation.

It should be indicated that, in the first re-program operation, in step S253, the operation of "mandatorily programming the first data into the second physical page" (i.e., first mandatory program operation) is different from the first program operation in step S23. Specifically, there are at least two differences as listed below. Firstly, the first mandatory program operation programs the first data into the second physical page, that is, another physical page different from the first physical page. Secondly, the mandatory program circuit 2151 mandatorily programs the first data into the second physical page before the operation of the logical-to-physical address mapping table (i.e., the step of "recording the second physical address of the second physical page into the logical-to-physical address mapping table to map the second physical address into the first logical address") is updated. In other words, after determining that the first data is programmed into the second physical page, the second physical address of the second physical page is then recorded into the logical-to-physical address mapping table to map the second physical address into the first logical address.

It should be pointed out that the mandatory program circuit 2152 may further include a large capacitor (not shown) which provides a back-up power. The back-up power is sufficient to mandatorily program a data and update a corresponding logical-to-physical address mapping table in the re-program operation, thereby avoiding the error of failed program operation caused by power-off event in the operation of mandatorily programming the data. In other words, in the first mandatory program operation, even if a sudden-power-off event is occurred, the first data can still be programmed into the second physical page, and the second physical address can be recorded into the logical-to-physical address mapping table (even the logical-to-physical address mapping table may further be written into the rewritable non-volatile memory module 220).

In step S254, the write resuming operation circuit 215 (or write data management circuit 2151) ignores the first data and does not read the first data from the register 2131, thus completing the first re-program operation.

It should be indicated that, in said another embodiment (embodiment corresponding to FIG. 3B), in response to determining to ignore the first data and not to read the first data from the register 2131, in the step of completing the first re-program operation, the write resuming operation circuit unit 215 (or mandatory program circuit 2152) further copies the second data into the register 2131 from the buffer memory 216, and mandatorily programs the second data into the second physical page. In addition, after the second data is programmed into the second physical page, the write resuming operation circuit unit 215 (or write data management circuit 2151) records the second physical address of the second physical page into the logical-to-physical address mapping table to map the second physical address into the first logical address, thereby completing the first re-program operation. On this occasion, the processor 211 may respond to the host system 10 that the second write command is completed. In other words, in said another embodiment, if it is found that there is other write command corresponding to the same logical address in the command queue, the write resuming operation circuit unit 215 further directly performs the mandatory program operation on the second data corresponding to said other write command, thereby ensuring that the second data of said other write command is mandatorily programmed into the rewritable non-volatile memory module 220. It should be indicated that, in an embodiment, after the second data is mandatorily programmed into the second physical page and before the second physical address of the second physical page is recorded into the logical-to-physical address mapping table, the write resuming operation circuit unit 215 (or write data management circuit 2151) may delete the second data and the second write command in the second command queue in the buffer memory 216.

It should be pointed out that, when starting to perform the first re-program operation, the processor 211 stops receiving any write command or data corresponding to any write command from the host system 10, and stops executing any write command in the command queue. In this manner, it is possible to avoid interference of other write commands while maintaining usable space in the buffer memory 216, thereby temporarily storing the first data to be re-programmed.

Further, after the first re-program operation is completed, the processor 211 resumes receiving said any write command or the data corresponding to said any write command from the host system 10, and resumes said any write command in the command queue. That is, after the first re-program operation is completed, the processor 211 resumes the overall operation of the storage controller 210 into a normal mode prior to performing the first re-program operation to receive command or data from the host system 10, and processes the command in the command queue as usual. Furthermore, after the first re-program operation is completed, the processor 211 writes the latest logical-to-physical address mapping table maintained in the buffer memory 216 into the rewritable non-volatile memory module 220.

It should be pointed out that, after starting to perform the first re-program operation and before completing the first re-program operation, if the processor 211 finds that there is a first read command (the first read command is arranged before the second write command) that is arranged after the first write command in the command queue, the first read command instructs to read the data stored in the first logical address. On this occasion, the processor 211 may directly read the first data from the register 2131, and transmits the first data to the host system 10, thereby directly completing the first read command.

Additionally, in an embodiment, the step of "recording the first physical address into the logical-to-physical address mapping table to map the first physical address into the first logical address" in step S23 may be performed after the first program operation is completed.

In summary, the data writing method and the storage controller provided in the embodiment of the disclosure are capable of directly reading the data from the register in response to determining that a program operation corresponding to a data is failed, thereby re-programming the data and resuming the previously failed program operation. In this manner, the completeness and reliability of the data writing operation of the storage device can be improved.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A data writing method, adapted for a storage device equipped with a rewritable non-volatile memory module, wherein the rewritable non-volatile memory module has a plurality of physical pages, the method comprising:
   receiving a first write command and a first data corresponding to the first write command from a host system, storing the first write command into a command queue in a buffer memory, and storing the first data into the buffer memory, wherein the first write command instructs to store the first data into a first logical address;
   starting to execute the first write command, copying the first data into a register, recording a first physical address into a logical-to-physical address mapping table to map the first physical address into the first logical address, responding to the host system that the first write command is completed, and starting to perform a first program operation to program the first data from the register into the first physical page; and
   performing a first re-program operation corresponding to the first data in response to determining that the first program operation is failed, the first re-program operation comprising:
      determining whether to read the first data from the register according to the logical-to-physical address mapping table, wherein the step of determining whether to read the first data from the register according to the logical-to-physical address mapping table comprises:
         identifying a third physical address mapped by the first logical address according to the logical-to-physical address mapping table;
         determining to ignore the first data and not to read the first data from the register in response to that the third physical address is not equal to the first physical address, and completing the first re-program operation;
      reading the first data from the register in response to determining to read the first data from the register; and
      mandatorily programming the first data into a second physical page, and after the first data is programmed into the second physical page, recording a second physical address of the second physical page into the logical-to-physical address mapping table to map the second physical address into the first logical address, thereby completing the first re-program operation.

2. The data writing method according to claim 1, wherein the first re-program operation further comprises:
   stopping receiving any write command or data corresponding to any write command from the host system, and stopping executing any write command in the command queue,
   wherein after the first re-program operation is completed, resuming receiving said any write command or the data corresponding to said any write command from the host system, and resuming said any write command in the command queue.

3. The data writing method according to claim 1, wherein the step of determining whether to read the first data from the register according to the logical-to-physical address mapping table further comprises:
   determining to read the first data from the register in response to that the third physical address is equal to the first physical address.

4. The data writing method according to claim 1, wherein the step of determining whether to read the first data from the register according to the logical-to-physical address mapping table further comprises:
   determining whether a second write command is stored in the command queue in response to that the third physical address is equal to the first physical address, wherein the second write command instructs to store a second data into the first logical address;
   determining to ignore the first data and not to read the first data from the register in response to determining that the second write command is stored in the command queue, and completing the first re-program operation; and
   determining to read the first data from the register in response to that the second write command is not stored in the command queue.

5. A storage controller, configured for controlling a storage device equipped with a rewritable non-volatile memory module, the storage controller comprising:
   a connection interface circuit, coupled to a host system;
   a memory interface control circuit, coupled to the rewritable non-volatile memory module, wherein the rewritable non-volatile memory module has a plurality of physical pages;
   a write resuming operation circuit unit; and
   a processor, coupled to the connection interface circuit, the memory interface control circuit and the write resuming operation circuit unit,
   wherein the processor is configured to receive a first write command and a first data corresponding to the first write command from a host system, stores the first write command into a command queue in a buffer memory, and stores the first data into the buffer memory, wherein the first write command instructs to store the first data into a first logical address,
   wherein the processor further starts to execute the first write command, copies the first data into a register, and records a first physical address into a logical-to-physical address mapping table to map the first physical address into the first logical address, wherein the processor further responds to the host system that the first write command is completed, and instructs the memory interface control circuit to start performing a first program operation to program the first data from the register into the first physical page,
   wherein the processor further instructs the write resuming operation circuit unit to perform a first re-program operation corresponding to the first data in response to determining that the first program operation is failed, the first re-program operation comprising:
      the write resuming operation circuit unit determines whether to read the first data from the register according to the logical-to-physical address mapping table, wherein in the operation that the write resuming operation circuit unit determines whether to read the first data from the register according to the logical-to-physical address mapping table, the write resuming operation circuit unit identifies a third physical address mapped by the first logical address according to the logical-to-physical address mapping table, wherein the write resuming operation circuit unit determines to ignore the first data and not to read the first data from the register in response to that the third physical address is not equal to the first physical address, and completes the first re-program operation;
      the write resuming operation circuit unit reads the first data from the register in response to determining to read the first data from the register; and
      the write resuming operation circuit unit mandatorily programs the first data into a second physical page, and after the first data is programmed into the second physical page, a second physical address of the second physical page is recorded into the logical-to-physical address mapping table to map the second physical address into the first logical address, thereby completing the first re-program operation.

6. The storage controller according to claim 5, wherein the first re-program operation further comprises:
   the processor stops receiving any write command or data corresponding to any write command from the host system, and stops executing any write command in the command queue,
   wherein after the first re-program operation is completed, the processor resumes receiving said any write command or the data corresponding to said any write command from the host system, and resumes said any write command in the command queue.

7. The storage controller according to claim 5, wherein in the operation that the write resuming operation circuit unit determines whether to read the first data from the register according to the logical-to-physical address mapping table,
   the write resuming operation circuit unit determines to read the first data from the register in response to that the third physical address is equal to the first physical address.

8. The storage controller according to claim 5, wherein in the operation of determining whether to read the first data from the register according to the logical-to-physical address mapping table,
   the write resuming operation circuit unit determines whether a second write command is stored in the command queue in response to that the third physical address is equal to the first physical address, wherein the second write command instructs to store a second data into the first logical address,
   wherein the write resuming operation circuit unit determines to ignore the first data and not to read the first data from the register in response to determining that the second write command is stored in the command queue, and completes the first re-program operation,
   wherein the write resuming operation circuit unit determines to read the first data from the register in response to determining that the second write command is not stored in the command queue.

* * * * *